United States Patent [19]
Lake

[11] Patent Number: 5,873,357
[45] Date of Patent: Feb. 23, 1999

[54] TWO PIECE HUMIDIFIER FOR HOT AIR FURNACE

[76] Inventor: Jared L. Lake, 1365 Old Garth Hts., Charlottesville, Va. 22901

[21] Appl. No.: 944,201

[22] Filed: Oct. 3, 1997

Related U.S. Application Data

[63] Continuation-in-part of Ser. No. 592,865, Jan. 24, 1996, Pat. No. 5,752,498, which is a continuation-in-part of Ser. No. 319,935, Oct. 7, 1994, Pat. No. 5,546,926.

[51] Int. Cl.$^6$ .............................. F24F 3/14; A61M 16/00
[52] U.S. Cl. ........................... 126/113; 137/392; 392/394
[58] Field of Search ............................ 126/113; 137/392; 392/406, 394

[56] References Cited

U.S. PATENT DOCUMENTS

| | | | |
|---|---|---|---|
| 3,209,125 | 9/1965 | Morrissey | 126/113 X |
| 3,219,795 | 11/1965 | Wiseman | 126/113 X |
| 3,523,175 | 8/1970 | Gygax | 126/113 X |
| 3,660,635 | 5/1972 | Liebert | 126/113 X |
| 5,067,169 | 11/1991 | Chiu | 392/406 |

*Primary Examiner*—William Wayner

[57] ABSTRACT

A humidifier for a hot air furnace is disclosed which has a housing with at least one open outlet to allow steam to enter the furnace. The housing also contains a heating device, water refill pipe and water level sensors and sensor housing. The sensors are preferably flexible wire with one end being free to flex. The housing also contains a water vessel attachment area which interacts with a housing attachment area to secure a water vessel to the housing. The water vessel contains a liner which has an integral flange around the periphery of the open end to form a gasket between the water vessel and housing. The housing attachment preferably contains at least one water seal which comes in contact with a flange and prevents steam from escaping the humidifier. Handles can be provided on the vessel to allow a user to easily rotate the vessel. A second open outlet can be provided to allow steam to enter the furnace through a moist air duct. A hot dry air input duct receives hot air from the furnace, directing the hot air from the furnace to the vessel, thereby increasing air flow and humidification.

20 Claims, 8 Drawing Sheets

TWO PIECE HUMIDIFIER FOR HOT AIR FURNACE

BACKGROUND OF THE INVENTION

Relate Back

This application is a Continuation-in-Part of U.S. Ser. No. 08/592,865 filed Jan. 24, 1996, now U.S. Pat. No. 5,752,498 which is a Continuation-in-Part of U.S. Pat. No. 5,546,926 issued Aug. 20, 1996 (Ser. No. 319,935 filed Oct. 7, 1994).

FIELD OF THE INVENTION

A humidifier is disclosed for incorporation in a hot air furnace which prevents mineral build-up on the sensors and water retaining vessel. Air convection between the furnace and the water vessel increases the level of evaporation and moisture transfer.

BRIEF DESCRIPTION OF THE PRIOR ART

Humidifiers are commonly used in homes during the winter to supplement the drop in humidity due to heating systems. Hot air systems tend to lower the humidity more than other systems, due to the evaporation of water particles during heating. This, and the fact that hot air furnaces are the easiest to fit with humidifiers, have opened the prior art to such devices. Most prior art devices for hot air systems use a "wetted element". The stationary type of element, such as a sponge, is kept wet through use of a constant flow of water. The rotating elements comprise a wheel or drum covered by a pad which continually rotates in water. The humidifier is connected to the house hold water supply and accordingly need not be manually refilled. However, the evaporation of water leaves behind mineral deposits and cleaning is required.

Evaporative humidifiers typically employ a capillary action to draw water into the filter or pad. The material of the pad is selected for its ability to exhibit a wicking action. The evaporative systems have the advantage of using little energy, using tap water, and unlike impeller systems, do not spray bacteria into the air along with moisture. The filter or pad must be periodically replaced and cleaning is required to deter growth of undesirable microorganisms.

Ultrasonic humidifiers employ a transducer and nebulizer which oscillates at about 1.7 million times a second in order to form a cool mist. While few microorganisms are released into the air, an annoying white dust is produced from the tap water.

In steam mist systems, water flows into a heating chamber, where it is kept at the boiling point. As the water boils, it releases moisture into the air. The system kills microorganisms through the boiling of the water and emits little or no white dust, but requires a high consumption of energy and the heating element may require extra cleaning to remove the accumulated hard-water minerals.

Impeller systems employ a fan or impeller which pumps water upwardly and slings water droplets into the air. The systems require soft water, distilled water or a demineralization cartridge rather than being a simple, tap water system.

In the drum type humidifier disclosed in U.S. Pat. No. 3,476,673, a chamber is provided for holding tap water or other liquid which is applied to an evaporator medium of a rotating drum. The liquid is evaporated from the evaporator medium into a hot air stream of a furnace to humidify the air stream.

A disadvantage to the drum type humidifiers is the necessity of removing accumulated dirt, dust, lime and other material deposits accumulated in the water reservoir chamber. Minerals, such as lime, will adhere to the surfaces of the chamber and wheel, making the chemicals difficult to remove.

U.S. Pat. No. 4,222,971 teaches the use of a liner for a drum-type humidifier which can be readily removed and replaced as needed. This, however, does not solve the problem of chemicals adhering to the wheel or other passage ways where water is in contact.

The chemical build-ups, that is mineral deposits in units such as these, can greatly reduce the efficiency of the humidifier. In areas where there is heavy chemical content in the water, the units can require constant cleaning.

The instant invention overcomes the problems associated with the prior art by eliminating many of the parts which are susceptible to chemical accumulation and by providing a readily disposable liner which serves to eliminate or minimize the cleaning operation normally associated with humidifiers.

SUMMARY OF THE INVENTION

A humidifier for a hot air furnace is disclosed which has a housing with at least one open outlet to allow steam to enter the furnace. The housing also contains a heating device, water refill pipe and a water level sensor housing. At least a minimum level and a maximum level sensor are placed at different levels along the water level sensor housing. A ground sensor is placed proximate the end of the water level sensor housing, below the level of the minimum water level sensor. A safety sensor is placed on the sensor housing above the maximum level sensor, thereby serving as a secondary water cutoff. The sensors are preferably flexible wire with one end extending from the sensor housing and a second end being free to flex. In an alternate embodiment support means can be used at the free end of the flexible wire to restrict the wire's movement. A temperature sensor, which can be placed at the end of the water level sensor housing, registers the current water temperature. Electronic controls monitor and regulate the water temperature, water refill and heater. The housing also contains a water vessel attachment area which interacts with a housing attachment area to secure a water vessel to the housing. The attachment can be through rotation or other securing methods. The water vessel contains a liner which has an integral flange around the periphery of the open end to form a gasket between the water vessel and housing. The housing attachment preferable contains at least one water seal which comes in contact with a flange and prevents steam from escaping the humidifier. Handles can be provided on the vessel to allow a user to easily rotate the vessel.

The housing can have a second open outlet opposite the water vessel to allow steam to enter the furnace through a moist air duct. The moist air output duct has a first end being affixed to a furnace duct and a second end secured to the second open outlet. A hot dry air input duct is provided which has a first end within the furnace duct and a second end proximate the vessel. Preferably the first end has an inverted cup configuration to increase the quantity of air received from the furnace. The input duct receives hot air from the furnace, directing the hot air from the furnace to the vessel, thereby increasing air flow and humidification. The input duct can be placed within the moist air output duct or run along the outside of the duct, entering the housing above the vessel.

BRIEF DESCRIPTION OF THE DRAWINGS

The advantages of the instant disclosure will become more apparent when read with the specification and the drawings, wherein.

DETAILED DESCRIPTION OF THE INVENTION

Figure 1:
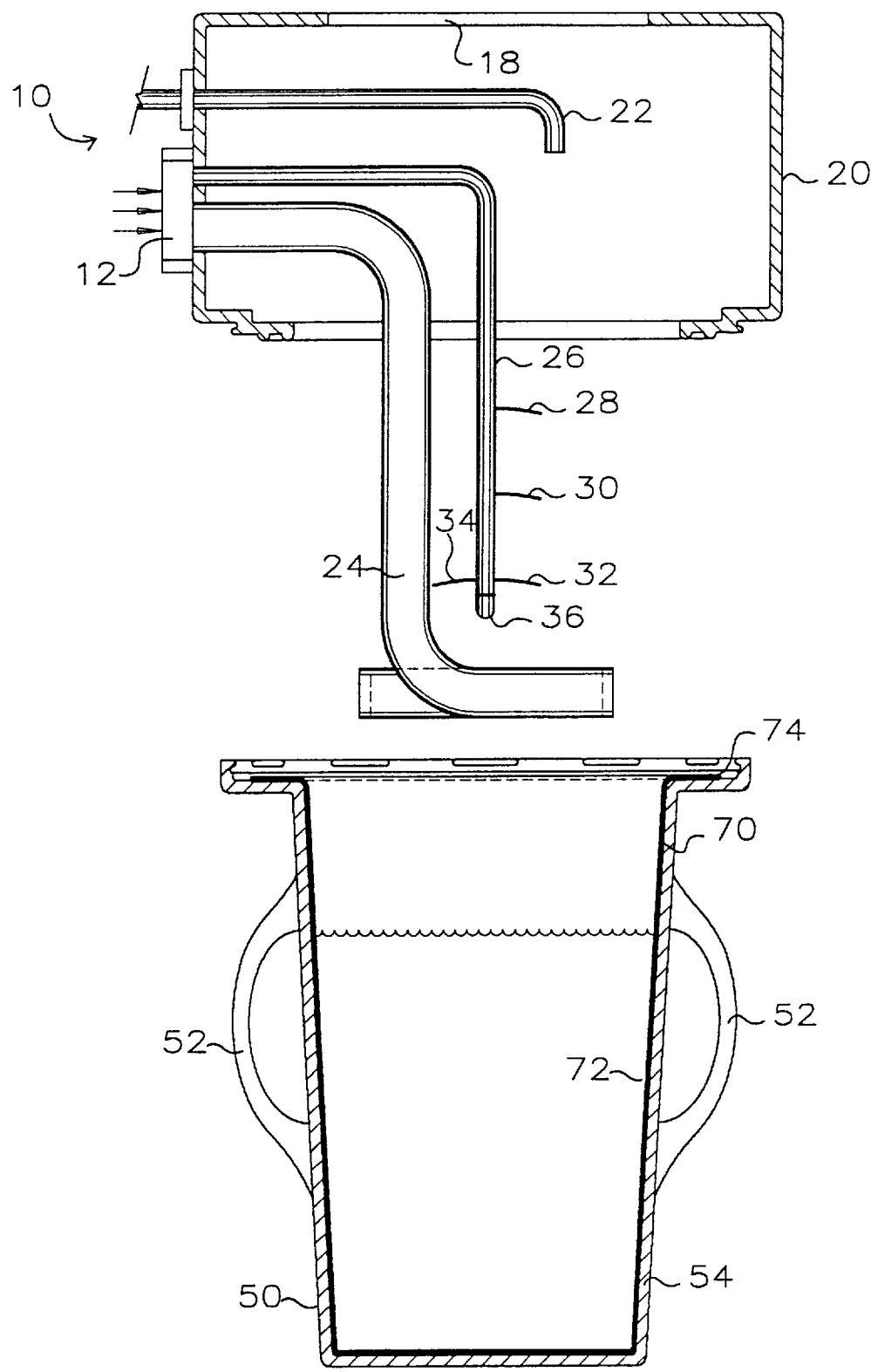
FIG. 1 is a cutaway side view of the humidifier unit with the water vessel and humidifier housing separated.

The two part humidifier unit 10, as disclosed herein, consists of a humidifier housing 20 and removable water vessel 50. The humidifier housing 20 contains the the water refill 22, heating unit 24 and sensor housing 26, as well as the electronic control means 12 associated with monitoring the heat and humidity levels. The electronic control means 12 associated with the operation of the disclosed humidifier monitors and controls the water temperature, humidity levels and water level based on preset parameters. The humidifier housing 20 must also provide means for mounting the humidifier to the furnace 200 of FIG. 6 or output duct 252 of FIG. 7, which is disclosed in detail further herein. In order to provide for the connection to the output duct 252, a receiving port 18 is provided in the top of the housing 20. The housing 20 can be manufactured with the receiving port 18 and, in the event the housing is mounted directly to the furnace, the receiving port 18 is covered with a cap 14, illustrated in FIG. 5.

The water refill 22 is connected, as known in the refrigeration art, directly to a water supply. The refilling of the water is controlled by the sensor housing 26, which monitors the water level in order to maintain the desired quantity of water within the vessel 50. The sensor housing 26 contains three water sensor electrodes 28, 30 and 32. The overflow sensor 28 serves as a back up in the event the end refill sensor 30 fails for some reason. The end refill sensor 30 serves to stop the refill of the vessel 50 once the water level reaches the height of the end refill sensor 30. The start refill sensor 32 is positioned proximate the end of the sensor housing 26 and, once the water level drops below the start refill sensor 32, the water refill 22 is activated. The ground wire 34 serves to ground the electrodes. The sensor electrodes 28, 30, 32 and 34 are constructed of thin wire between one quarter and one inch long. The wire must have a gauge which allows for movement of the wire as the water level changes. The material of manufacture can be any conductive material which has a porosity less than the mineral deposits being deposited. The density of the material prevents the deposits from being embedded within the wire, allowing for only surface adhesion. The movement of the wire "cracks" any accumulated deposits, causing the deposits to fall to the bottom of the liner. Alternatively, the wire can be coated with a conductive material which resists mineral build-up. Alternatively, nanowire can be used for the sensor wires. Periodic small electric currents applied to the nanowire cause the wire to contract, thereby cracking any built-up deposits.

The sensor electrodes 28, 30, 32 and 34 all extend into the sensor housing 26, and lead into the electronic control means 12. The entry port from the electrodes into the housing 26 must be sealed to prevent water leakage into the housing 26, thereby creating the possibility of false readings. To seal the entry ports, the entire housing 26, with electrodes in place, can be "dipped" into a slick, Teflon equivalent material, with the material then being removed from the electrode wires. In the event the housing 26 is not dipped into a slick material, it must be manufactured from a Teflon equivalent material to prevent mineral build-up.

The end of the sensor housing contains the temperature sensor 36 which monitors the current water temperature. The placement of the start refill sensor 32 must be sufficiently above the temperature sensor 36 to prevent the water level from falling below the sensor 36, thereby exposing the sensor 36 to the air. The sensor 36 is electronically connected to the heating unit 24 in order to activate and deactivate the heating unit 24 once the water temperature falls below a preset level. The heating unit 24 is placed at a lower level than the sensor 36 to ensure the heating unit 24 is in the water at all times. In order to provide proper health safety, the preset heat level should be sufficiently high to kill bacteria and provide for efficient water evaporation. For maximum efficiency, the heating unit 24 should be manufactured from a material which resists mineral build-up, such as a bi-metal. Alternatively, by using a heating element having an oval shape, the mineral build-up does not adhere due to the element shape.

Figure 2:
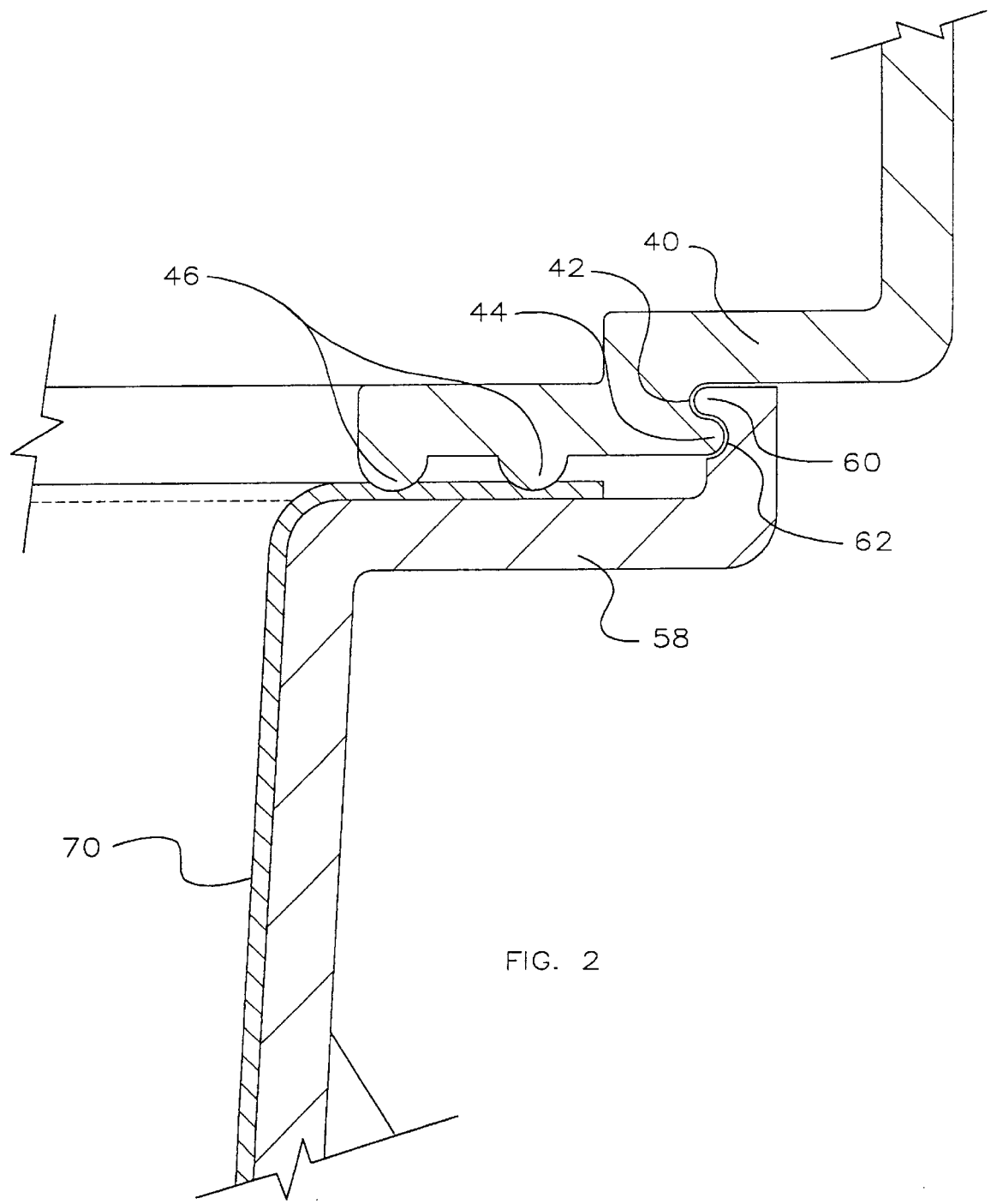
FIG. 2 is a cutaway, side view of the locking mechanism between the humidifier housing and the water vessel.
Figure 3:
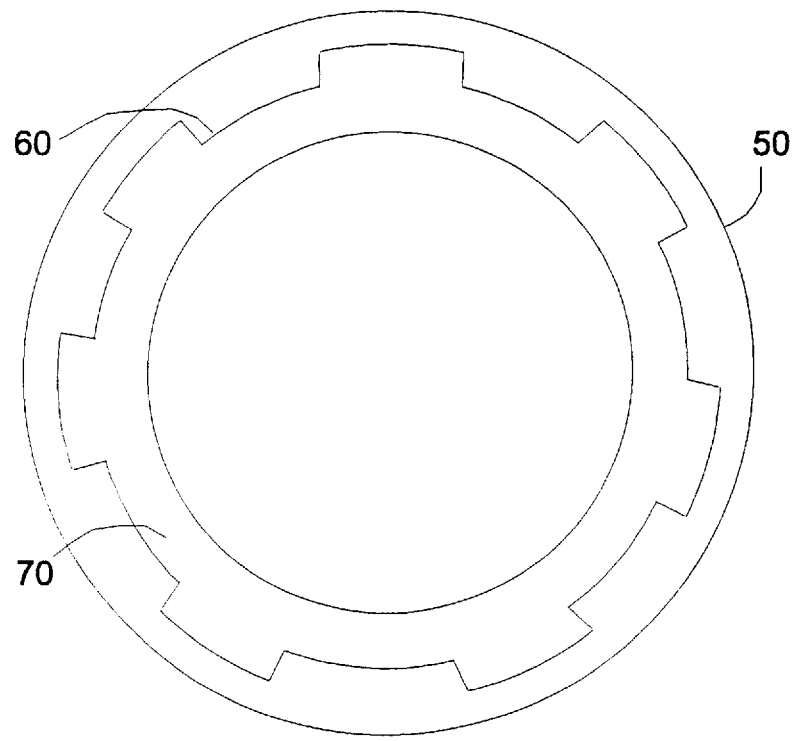
FIG. 3 is a top view of the locking mechanism of the water vessel.
Figure 4:
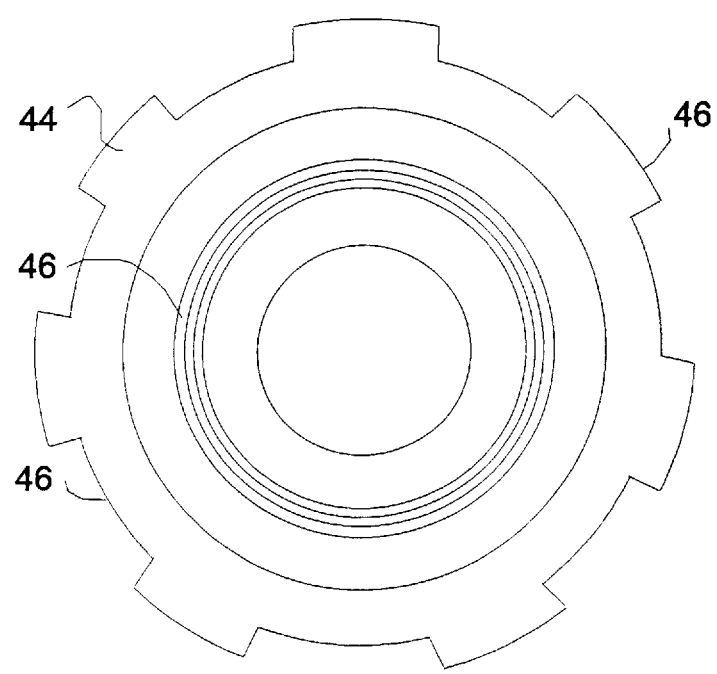
FIG. 4 is a bottom view of the locking mechanism of the humidifier housing.

The water vessel 50 can be manufactured from any material which can withstand the required temperatures, for example stainless steel, aluminum or high density polyethylene. The vessel 50 is provided with two handles 52 which are sized and positioned to allow for the user to grip and rotate the vessel 50. The handles 52 can either be added to the vessel body 54 or molded as an integral part of the unit. The vessel flange 58 is L-shaped with a twist lock ridge 60 and vessel channel 62, which is shown in greater detail in FIG. 2. The humidifier housing 20 and the vessel 50 are locked together by the humidifier housing flange 40 and vessel flange 58, which are designed to interact, and lock in place. The connection between the housing flange 40 and the vessel flange 58 can be seen more clearly in FIGS. 3 and 4 and is similar to that to child proof caps and other twist locking mechanisms known in the art. The twist lock ramp 44 of the housing flange 40 fits into ramp receiving notches 48, allowing the vessel flange 58 to come into contact with the housing flange 40. The vessel 50 is then twisted, moving the twist lock ridge 60 of the vessel flange into the flange channel 42 and the locking ramp 44 into the vessel channel 62. To remove the vessel 50 from the flange 40, the vessel 50 is twisted in the opposite direction. Although it is preferable to have "stops" within the channel to prevent the user from continuing to rotate the cup until it reaches the removal position, it is not necessary. Although the method of affixing the water vessel 50 to the housing 20 illustrated incorporates a twist lock, other methods, such as a tension locking clip, can be used.

The upper housing flange 40 is provided with water seal ribs 46 which extend around the perimeter of the flange 40. The ribs 46 interact with the liner 70 to form a tight seal, preventing steam from escaping, as well as mineral build-up within the vessel channel 62 and flange channel 42. The liner 70 is manufactured from a thermoplastic rubber, or other material which provides the same performance. Some materials, such as silicone rubber deteriorate from the heat and should be avoided. The liner 70 must have sufficient flexibility, as is inherent in thermoplastics, to allow for the ribs 46 to depress into the liner 70 material to form the required seal. The liner 70 must also be capable of resisting any reaction to the constant heat maintained within the humidifier, such as deterioration or deformation. As the water contained in the liner 70 is evaporated into the heating system, the liner 70 must be an inert material which is bacteria resistant. The liner 70 is manufactured with a body 72 and lip 74. The lip 74 extends at least a sufficient distance along the vessel flange 58 to allow for interaction with the seal ribs 46. The exterior dimensions of the liner 70 must be within about 1/32 of an inch of the interior dimensions of the vessel 50. The liner 70 preferably resists permanent adhesion of the mineral build up created during humidification, allowing the liner 70 to be removed from the vessel 50 and the build-up removed from the liner 70. Due to the resistance of permanent adhesion and the flexibility of the material of manufacture, the mineral build-up can be removed by flexing the liner 70. Alternatively, the liner 70 can be disposable. By providing the body 72 and lip 74 as one continuous element, the chance of leakage is minimized. Further, the liner 70 is the only surface within the vessel 50 exposed to the mineral build-up, thereby extending the life of the equipment as well as eliminating messy clean up.

Figure 5:
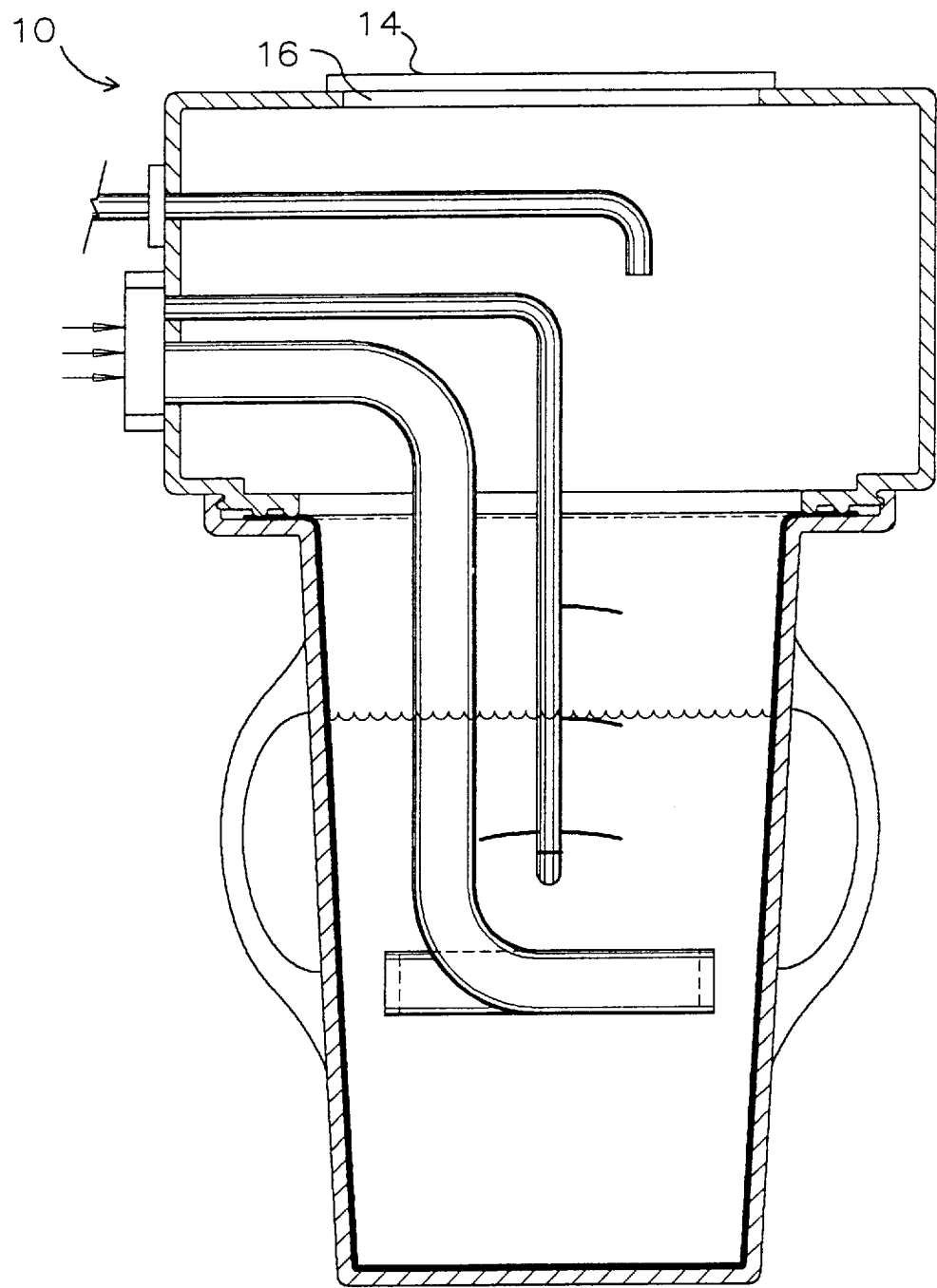
FIG. 5 is a cutaway side view of the assembled humidifier unit.

The assembled humidifier unit 10 is illustrated in FIG. 5, thereby providing an example of the preferred dimensions. The cap 14 has been applied to block the receiving port 18.

Figure 6:
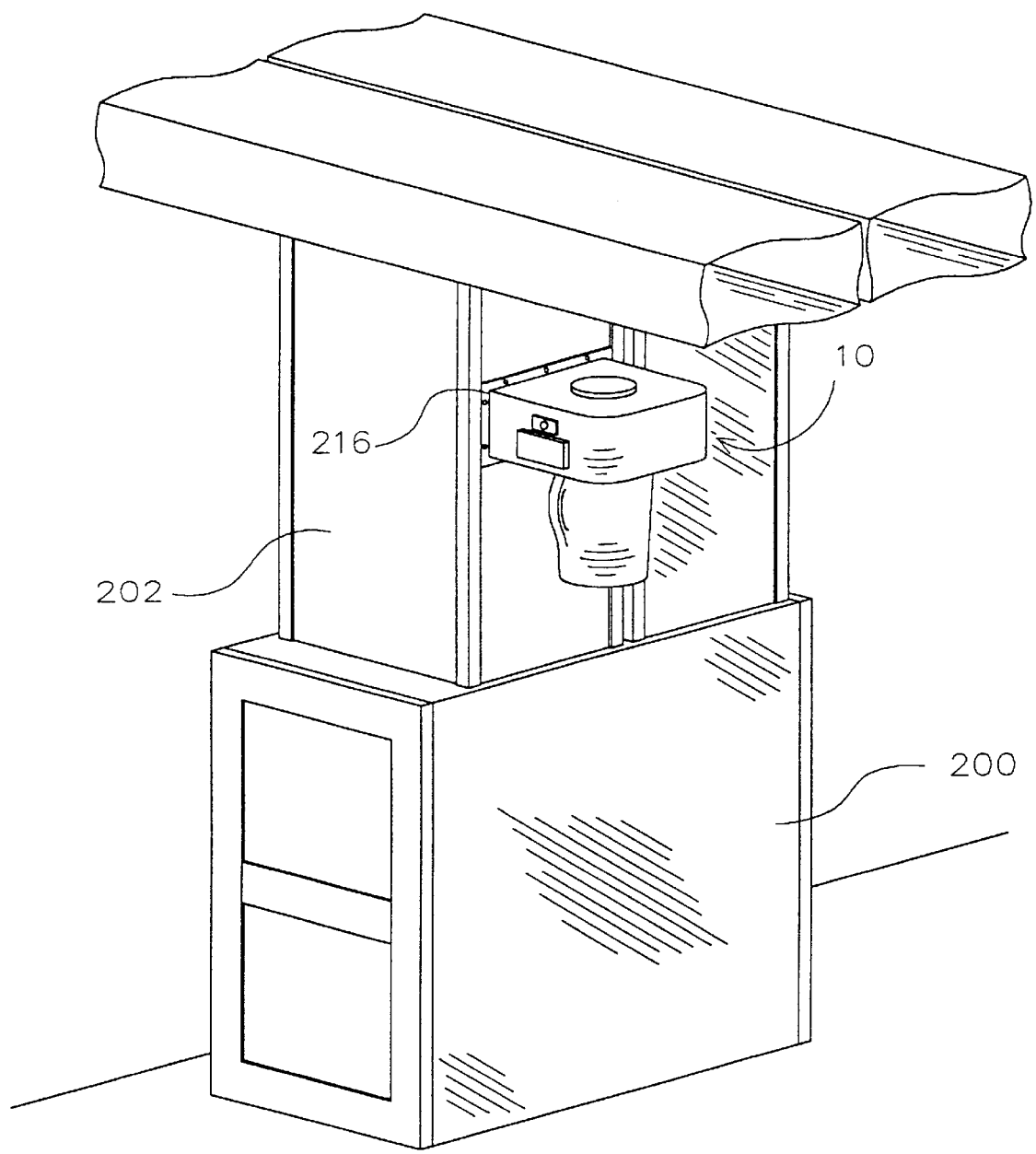
FIG. 6 is a perspective view of the humidifier unit attached to a furnace.

The humidifier unit 10 has been mounted directly to the furnace in FIG. 6. At time of manufacture, the humidifier unit 10 is provided with an open side to which mounting means 16 have been attached. In FIG. 6 the mounting means 16 is a frame which is used to affix the humidifier unit 10 to the furnace 200. As the humidifiers are affixed to the hot air supply plenum 202, the air flow created by the rising heat distributes the moisture through the house.

Figure 7:
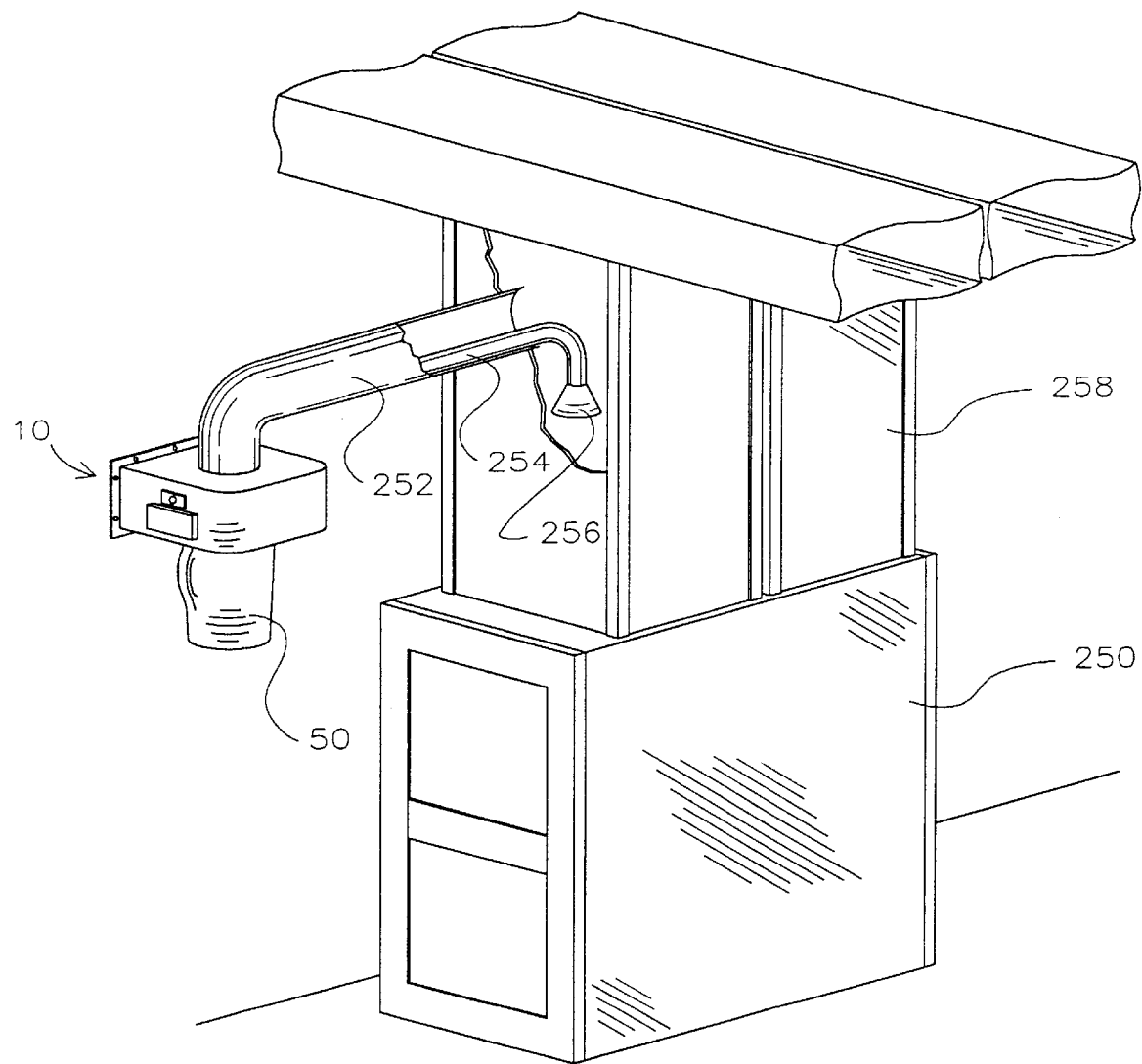
FIG. 7 is a perspective view of the humidifier unit attached to a wall with a moist air output duct connecting the humidifier unit to the furnace with the connecting area between the moist air output duct and the furnace exposed.
Figure 8:
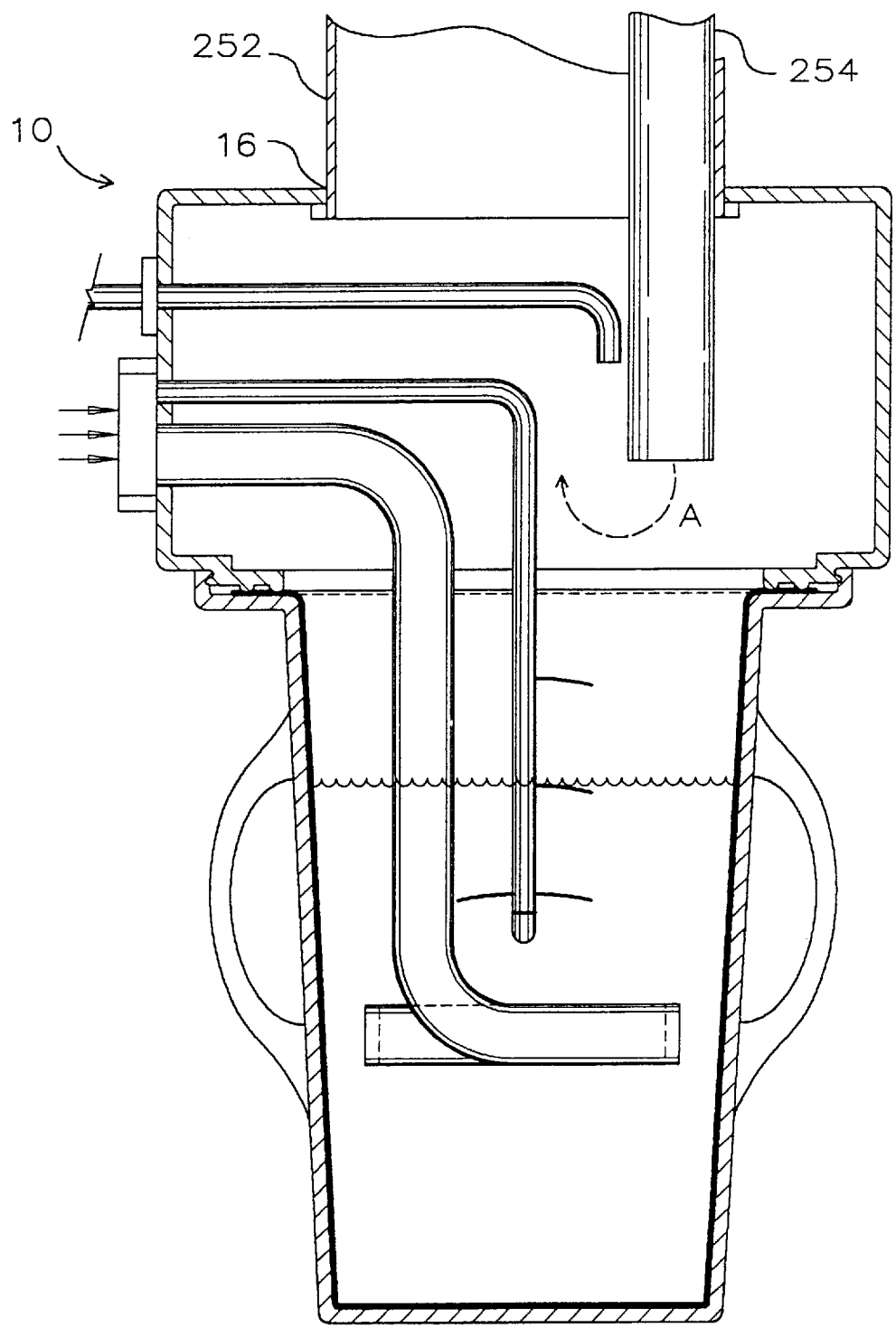
FIG. 8 is a cutaway, side view of the dry air input duct within the humidifier unit.

In FIG. 7 the humidifier unit 10 is attached to a wall for stability and a moist air output duct 252 used to connect the humidifier unit 10 to the furnace 250. Within the moist air output duct 252 is a dry air input duct 254 which extends from the plenum 258 to the humidifier unit 10. The dry air input duct 252 has an inverted cup 256 at the open end placed within the plenum 258. A portion of the dry air being turned out from the furnace 250 is caught in the inverted cup 256 and pushed along the duct 254 into the vessel 50. The dry air input duct 252 ends about one (1) to three (3) inches above the high water level within the vessel 50. Although not critical, the preferred diameter for the input duct 254 is about two (2) inches and the diameter for the moist air output duct 252 about six (6) inches. Although the diameter of the ducts can be reduced the diameter must remain sufficient to allow for effective air flow. As illustrated in FIG. 8, as the air comes into the vessel 50, turbulence is caused within the water, thereby increasing the evaporation process. Additionally, as air is brought into the humidifier 10 through the input duct 254, following the path of Arrows A, it displaces the air within the humidifier 10, thereby increasing the air flow through the humidifier. This flow works similar to a fan, without the need for additional electronics or equipment. When the humidifier 10 is placed directly against the wall, it is preferable that a metal plate be placed within the open side to prevent the moisture from penetrating the wall. This plate can be incorporated as an add on to the mounting means 16. Although the designed illustrated herein places the input duct 254 within the moist air duct 252, the input duct can run along the exterior of the moist air duct 252, entering the humidifier through the housing.

Figure 9:
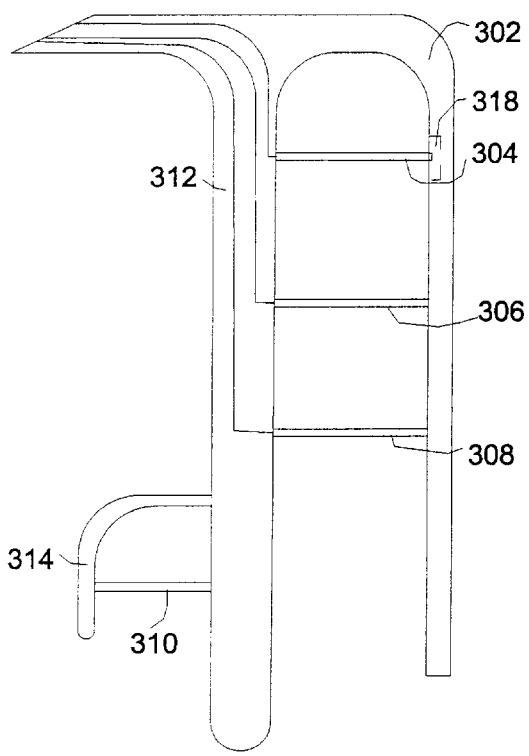
FIG. 9 is a side view of an alternate embodiment of the water level sensor.
Figure 10:
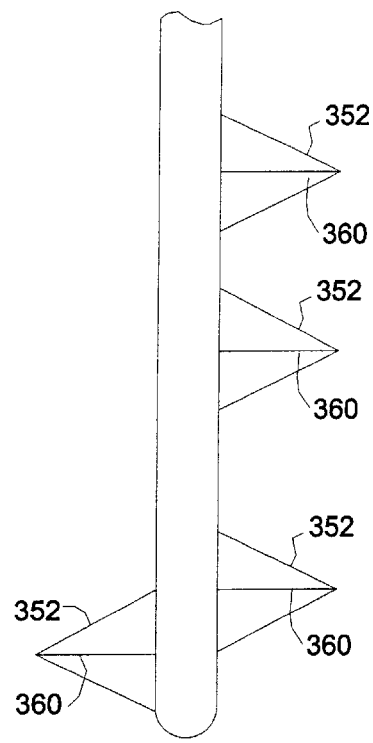
FIG. 10 is a side view of another embodiment of the water level sensor.

FIGS. 9 and 10 illustrate alternate embodiments to the foregoing water sensor. In FIG. 9, the sensor housing 312 continues to house the sensor electrodes and connecting wires. The sensors 304, 306 and 308 and ground wire 310, however, are supported by sensor brace 302 and ground brace 314. In order to facilitate the removal of mineral build-up, the sensor wire 304 is allowed to float within sensor inlet 318. Although only sensor 304 is illustrated in this matter, all sensors would have their respective inlet. By incorporating sensor inlets 318, the wires are allowed to move to promote removal of the build-up while not being required to be self-supporting. The size of the inlet 318 is dependent upon the gauge of the wire and material of manufacture. In FIG. 10 the sensors 360 are supported by V-shaped supports 352. The V-shaped supports 352 are used herein as examples of individual support configurations and alternative configurations can be used which provide the required support for the sensor wires.

Since other modifications and changes varied to fit particular operating requirements and environments will be apparent to those skilled in the art, the invention is not considered limited to the example chosen for the purposes of disclosure, and covers all changes and modifications which do not constitute departures from the true spirit and scope of this invention.

What is claimed is:

1. A humidifier for a hot air furnace having:

a housing, said housing having at least one open outlet to allow steam to enter said furnace and water vessel attachment means, control means, heating means, said heating means being regulated by said control means, water refill means, said water refill means being regulated by said control means, a sensor housing, said sensor housing having a first end and a second end, at least two water level sensor means, said at least two water level sensor means being at different levels along said sensor housing, said sensors being a minimum level sensor and a maximum level sensor, temperature sensing means, said temperature sensing means transmitting water temperature to said control means, a water vessel, said water vessel having housing attachment means to interact with said water vessel attachment means, a water vessel liner, said liner having a flange around an open end periphery, said flange forming a gasket between said water vessel attachment means and said housing attachment means.

2. The humidifier of claim 1 wherein said water level sensor means further comprises a ground sensor, said ground sensor being proximate said second end of said sensor housing.

3. The humidifier of claim 1 wherein said water level sensor means further comprises a safety sensor, said safety sensor being at a level along said sensor housing closer to said first end than said maximum level sensor, thereby serving as a secondary cutoff for said water refill means.

4. The humidifier of claim 3 wherein said sensors are flexible wire, a first end of said flexible wire extending from said sensor housing and a second end of said wire being free to flex.

5. The humidifier of claim 3 further comprising support means, said support means being proximate a second end of said flexible wire and restricting the movement of said wire.

6. The humidifier of claim 1 wherein said temperature sensing means is positioned at said second end of said sensor housing.

7. The humidifier of claim 1 wherein said vessel further comprises gripping means, said gripping means allowing a user to easily rotate said vessel.

8. The humidifier of claim 1 wherein said water vessel attachment means and said housing attachment means interact by rotating into a locking position.

9. The humidifier of claim 1 wherein said housing has a second open outlet opposite said water vessel to allow steam to enter said furnace through a duct.

10. The humidifier of claim 9 further comprising a moist air output duct, said output duct having a first end and a second end, said first end being affixed to a furnace duct and said second end being affixed to said second open outlet.

11. The humidifier of claim 10 further comprising a hot dry air input duct, said input duct having a first end and a second end, said first end being within said furnace duct and said second end being proximate said vessel, said input duct being positioned to receive hot air from said furnace and direct said hot air from said furnace to said vessel, thereby increasing the air flow and humidification within said humidifier.

12. The humidifier of claim 11 wherein said input duct is placed within said moist air output duct.

13. The humidifier of claim 11 wherein said hot dry air input duct further comprises an inverted cup as said first end, said inverted cup increasing the quantity of air received from said furnace.

14. The humidifier of claim 1 wherein said liner flange is integral with said liner.

15. The humidifier of claim 1 water vessel attachment means further comprise at least one water seal means, said water seal means being in contact with said flange and preventing steam from escaping said humidifier.

16. The method of humidifying a structure having a hot air furnace comprising:
a humidifier said humidifier having:
 a housing, said housing having at least one open outlet to allow steam to enter said furnace and water vessel attachment means, said water vessel attachment means having at least one water seal means, said water seal means preventing steam from escaping said humidifier,
 control means,
 heating means, said heating means being regulated by said control means,
 water refill means, said water refill means being regulated by said control means,
 a sensor housing, said sensor housing having a first end and a second end,
 at least two water level sensor means, said at least two water level sensor means being at different levels along said sensor housing, said sensors being a minimum water level sensor and a maximum water level sensor,
 a ground sensor, said ground sensor being proximate said second end of said sensor housing,
 a safety sensor, said safety sensor being at a level along said sensor housing closer to said first end than said maximum level sensor to serve as a secondary cutoff for said water refill means,
 temperature sensing means, said temperature sensing means being positioned at said second end of said sensor housing and transmitting water temperature to said control means,
 a water vessel, said water vessel having housing attachment means to interact with said water vessel attachment means and gripping means, said gripping means allowing a user to easily hold said vessel,
 a water vessel liner, said liner having a flange, integral with said liner, around an open end periphery, said flange forming a gasket between said water vessel attachment means and said housing attachment means and interacting with said water seal means to prevent steam from escaping, comprising the steps of:
a. placing said liner in said water retaining vessel;
b. placing said housing attachment means of said water vessel adjacent said water vessel attachment with said water seal means forming a seal with said flange,
c. securing said water vessel to said housing by said housing attachment means and said water vessel attachment means,
d. activating said power source,
e. registering the current water level on said water level sensors,
f. transmitting said water level to said control means,
g. activating said water refill means to fill said vessel to said maximum water level sensor,
h. deactivating said water refill means when said water reaches said maximum water level sensor,
i. reading said current water temperature at said temperature sensing means,
j. transmitting the current water temperature to said control means,
k. activating said heating means to raise the ambient temperature in said heat chamber to a level sufficient to cause water evaporation,
l. causing the moisture created through evaporation to rise through said duct into said furnace duct work,
m. monitoring said water and heat levels to prevent said water level from dropping below said minimum water level and maintain sufficient water temperature to cause humidification,
whereby said moisture is distributed throughout the house through said furnace duct work, raising the moisture level throughout the house.

17. The method of claim 16 further comprising the steps of:
increasing the rate of evaporation by incorporating a moist air duct and a dry air duct, said dry air duct bringing air from said furnace into said humidifier and said moist air duct taking humidified air from said humidifier to said furnace duct work.

18. The humidifier of claim 17 further comprising a moist air output duct, said output duct having a first end and a second end, said first end being affixed to a furnace duct and said second end being affixed to said housing and a hot dry air input duct, said input duct having a first end and a second end, said first end being within said furnace duct, with an inverted cup at said first end to increase the quantity of air received from said furnace, and said second end being proximate said vessel, said input duct being placed within said moist air duct and positioned to receive hot air from said furnace and direct said hot air from said furnace to said vessel, thereby increasing the air flow and humidification within said humidifier.

19. A humidifier for a hot air furnace having:

a housing, said housing having at least one open outlet to allow steam to enter said furnace and water vessel attachment means, said water vessel attachment means having at least one water seal means, said water seal means preventing steam from escaping said humidifier, control means, heating means, said heating means being regulated by said control means, water refill means, said water refill means being regulated by said control means, a sensor housing, said sensor housing having a first end and a second end, at least two water level sensor means, said at least two water level sensor means being at different levels along said sensor housing, said sensors being a minimum level sensor and a maximum level sensor, a ground sensor, said ground sensor being proximate said second end of said sensor housing, a safety sensor, said safety sensor being at a level along said sensor housing closer to said first end than said maximum level sensor to serve as a secondary cutoff for said water refill means, temperature sensing means, said temperature sensing means being positioned at said second end of said sensor housing and transmitting water temperature to said control means, a water vessel, said water vessel having gripping means, said gripping means allowing a user to easily rotate said vessel and housing attachment means to interact with said water vessel attachment means, a water vessel liner, said liner having a flange, integral with said liner, around an open end periphery, said flange forming a gasket between said water vessel attachment means and said housing attachment means and interacting with said water seal means to prevent steam from escaping.

20. The humidifier of claim 19 further comprising a moist air output duct, said output duct having a first end and a second end, said first end being affixed to a furnace duct and said second end being affixed to said housing and a hot dry air input duct, said input duct having a first end and a second end, said first end being within said furnace duct, with an inverted cup at said first end to increase the quantity of air received from said furnace, and said second end being proximate said vessel, said input duct being placed within said moist air duct and positioned to receive hot air from said furnace and direct said hot air from said furnace to said vessel, thereby increasing the air flow and humidification within said humidifier.

* * * * *